United States Patent

[11] 3,572,887

[72] Inventor Horst Leitzsch
    Neuenreuth near Creussen, Germany
[21] Appl. No. 802,183
[22] Filed Feb. 25, 1969
[45] Patented Mar. 30, 1971
[73] Assignee Steiner-Optik Karl Steiner
    Postfach, Bayreuth, Germany

[54] OPTICAL INSTRUMENT FOR VIEWING DISTANT OBJECTS
    4 Claims, 4 Drawing Figs.
[52] U.S. Cl. .................................. 350/51,
    350/36, 350/287
[51] Int. Cl. ................................. G02b 23/02
[50] Field of Search .......................... 350/286,
    287, 36, 50, 51, 52, 53, 71, 75—77

[56] References Cited
    UNITED STATES PATENTS
    904,066  11/1908  Jacob .................... 350/287
    1,717,044  6/1929  Kosken .................. 350/287
    2,400,252  5/1946  Noske ................... 350/287X
    FOREIGN PATENTS
    308,503  3/1929  Great Britain ........... 350/287

Primary Examiner—David H. Rubin
Attorney—Hane & Baxley

ABSTRACT: In an optical instrument for viewing distant objects, and in particular in a binocular, the eyepiece is mounted directly in the casing of the instrument and the prism system and the objective are mounted on a common carrier which is inserted into the casing and retained therein in the correct optical position by locating means on the carrier and in the casing.

PATENTED MAR 30 1971    3,572,887

INVENTOR.
HORST LEITZSCH
BY Hane and Baxley
ATTORNEYS

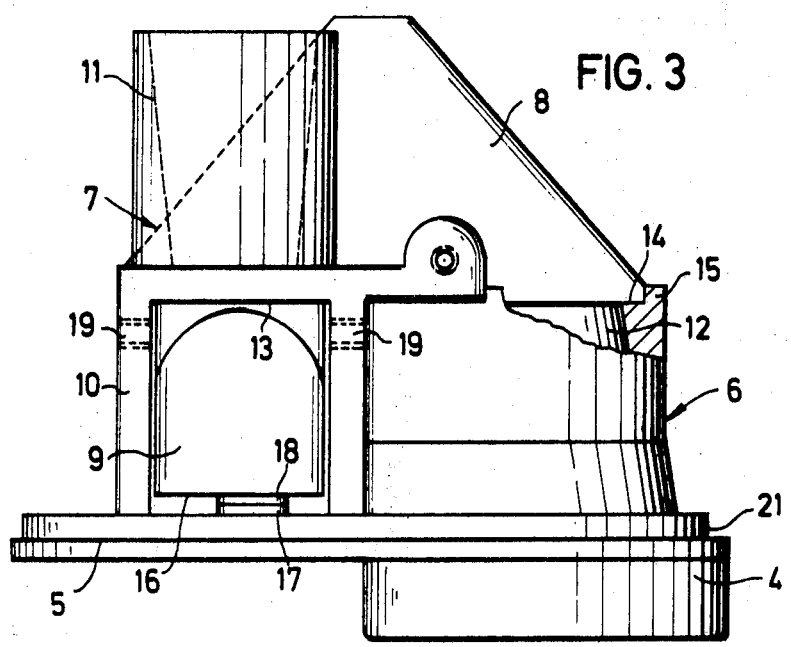
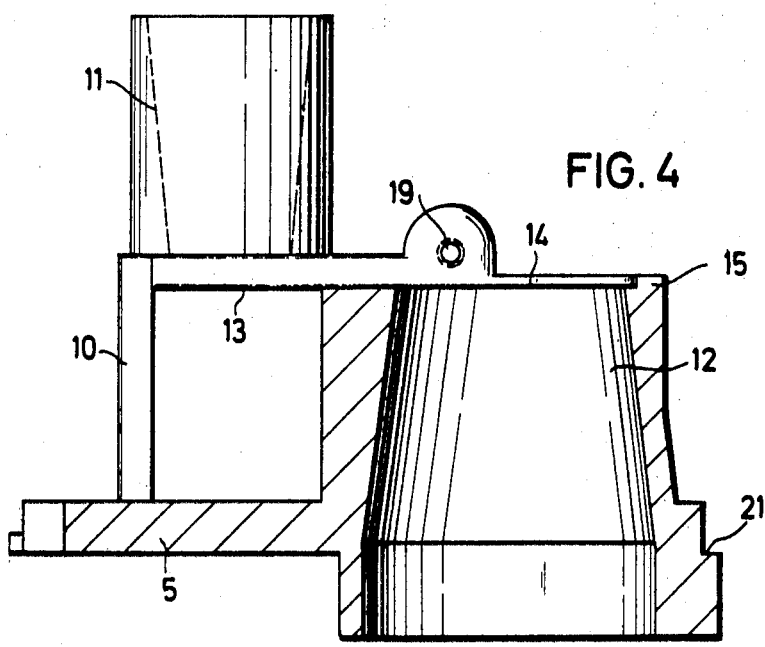

OPTICAL INSTRUMENT FOR VIEWING DISTANT OBJECTS

The invention relates to an optical instrument for viewing distant objects and more particularly to a binocular having two refracting telescopes mounted on a single frame and including erecting optical systems.

BACKGROUND

Binoculars of the kind above referred to generally comprise for each monoscope of the binocular an eyepiece, a prism system and an objective disposed in optically aligned relationship.

When such binoculars are assembled the adjustment of the three optical systems in each monoscope, the one in relation to the other and each in relation to the casing of the binocular presents considerable difficulties which have an adverse effect upon the cost of production. At the same time repairs which may be required are difficult to effect. This applies particularly to the conventional form of construction in which the prism systems are secured in the casing independently of the eyepieces and the objectives.

According to an earlier proposal the eyepieces, objectives and the prism systems are each independently adjusted to zero and then inserted into predetermined seats in the casing, to eliminate the need for further adjustment of the optical components in the completely assembled binocular.

THE INVENTION

The present invention carries forward this type of prior arrangement and has for a broad object to provide a further simplification of the assembly of binoculars during production as well as of any repairs that may be required, and also the elimination of faults due to incorrect adjustment.

According to the present invention the prism system and the objectives lens are mounted in a relatively adjusted position on a common carrier and this carrier is inserted into the casing in a tight locating fit.

The prism system and the objective lens are thus each optically adjusted and also relative to each other. In this condition they are inserted into the seat provided in the casing so that only the eyepiece requires adjustment. As is known, this latter adjustment is relatively easy to perform.

The arrangement is particularly, though not exclusively, suitable for binoculars with casings made of plastics material. In such a binocular the carrier may consist of the same material as the casing so that misalignments and other defects due to different properties of the different materials are avoided. Preferred plastics materials are polycarbonates because they are dimensionally particularly stable.

According to a further development of the invention the carrier has two coplanar opposite abutment surfaces for two prisms which are located consecutively in the path of the light rays. Generally the prisms will be cemented together so that their cooperating hypotenuse or base faces are substantially likewise contained in the same plane. This feature of the invention greatly simplifies adjustment.

According to yet another feature of the invention the prism system is adhesively attached to the common carrier and the latter has a flange partly encompassing an abutment surface for one of the prisms. This flange facilitates centering when locating the prisms in the carriers. It also retains the adhesive while the adhesive bond is being formed and thus assures a satisfactory bond.

It is also within the scope of the present invention to key one of the prisms of the prism system against its abutment surface. The key connection may be established with the aid of two keys of which one may be integrally formed on the carrier so that only one key is needed as a loose and independent component. The key connection assures that the prisms will bear flush against the cooperating surface of the carrier and at the same time the location thus achieved can be easily changed for purposes of adjustment.

Finally the fitting seat of the common carrier in the casing may be provided with at least one slot or projection such as a pin which serves for accurate aligning by cooperating with a corresponding recess.

An embodiment of the invention is, by way of example, hereinafter more fully described and illustrated in the accompanying drawings, in which:

FIG. 3 is a side elevational view, partly broken away, of the carrier of FIG. 2, showing the prism system inserted thereinto; and FIG. 4 is a longitudinal section of the carrier shown in FIG. 3.

Figure 1:
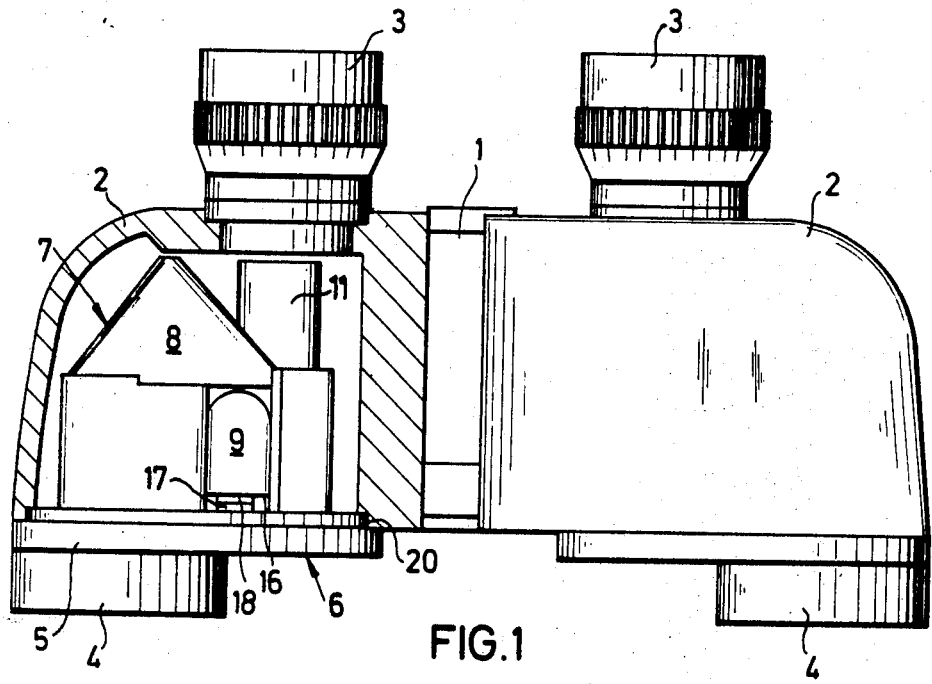
FIG. 1 is an elevational partly sectional view of a binocular.

The binocular comprises a twin casing the two components 2 of which are hingedly connected together by a central joint 1. One end of each casing 2 carries an eyepiece 3 which includes a conventional lens system not shown in detail. The other end of each casing of the binocular carries an objective 4 which includes a conventional lens system likewise not shown in the drawing.

The objective 4 is affixed to a plate 5 which is a component part of a carrier 6 which, besides the objective 4, also carries a prism system 7. In the illustrated embodiment this system is an erecting Porro system, comprising two right angle prisms 8 and 9. The plate 5 of the optics carrier 6 has secured thereto or is integral with a mount 10 forming a tubular shield light a tubular light shield 11 for the exit prism 9 and a tubular light shield 12 for the entry prism 8. An abutment face 13 for the exit prism 9 and an abutment face 14 for the entry prism 8 are coplanar, the latter abutment face being partly encompassed by a flange 15.

Between face 16 at the vertex or head of prism 9 and the plate 5 of the carrier 6, key means 17 and 18 are interposed, key 17 may be integrally formed with the plate 5 and key 18 is a separate component which is tightly wedged into place. Key 18 may be visualized as a wedge or shim of conventional shape. The length and shape of both keys are such that they will not protrude into the path of light. FIG. 3 shows the customarily rectangular back of such keys. This arrangement presses the hypotenuse or base face of the prism 9 tightly against the abutment face 13 of the carrier. The latter is preferably provided with holes 19 for the reception of adjusting screws not shown in the drawing.

The opening in the casing for the reception of carrier 6 with prisms 8 and 9 and the objective lens 4 mounted thereon is provided with a stepped fitting surface 20 which cooperates with a corresponding step or shoulder 21 on the periphery of the plate 5, thereby assuring a satisfactory fitting connection between the casing 2 and the carrier 6.

Figure 2:
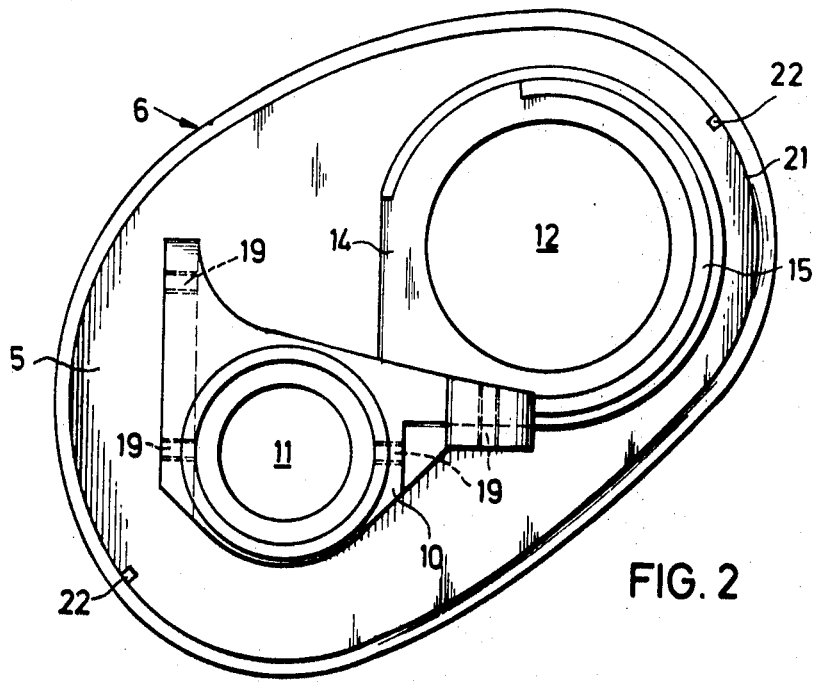
FIG. 2 is a plan view from above of the common carrier, shown on a larger scale.

The plate 5, as is shown in FIG. 2, has two locating lugs 22 on opposite sides which engage cooperating recesses (not shown) in the casing 2 of the binocular.

I claim:

1. An optical instrument for viewing distant objects, said instrument comprising:

a generally tubular casing;

an eyepiece mounted at one end of said casing, the other end of the casing including a receiving opening;

an objective lens system and a pair of right-angle prisms constituting an erecting Porro prism system;

a common carrier for said objective lens and prism systems, said carrier including a cover plate adapted to fit said receiving opening and having mounting means for said objective lens system, an apertured mount connected to said cover plate and having prism locating surfaces lying in a common plane parallel to the plane of said cover plate for supporting the hypotenuse faces of said right-angle prisms, a first tubular light shield connecting the objective lens system mounting means with the aperture for the entrance face of one prism and a second tubular light shield extending from the aperture for the exit face of the other prism toward said eyepiece, means carried by said apertured mount for holding said prisms against said prism locating surfaces; and locating means on the casing and the carrier retaining the latter on the casing in an optically fixed relationship.

2. The optical instrument according to claim 1 wherein said locating means comprises a recess and a protrusion on the casing and the carrier respectively engageable with each other for centering the carrier with reference to the casing.

3. The optical instrument according to claim 1 wherein said prism holding means comprise a wedge surface formed on a portion of said apertured mount facing the prism apex and a cooperating wedge element inserted between said wedge surface and said prism apex.

4. The optical instrument according to claim 1 wherein the common carrier is formed of dimensionally stable polycarbonate plastic material.